United States Patent
Yi et al.

(10) Patent No.: US 10,582,540 B2
(45) Date of Patent: Mar. 3, 2020

(54) METHOD FOR PERFORMING RANDOM ACCESS PROCEDURE IN ENHANCED COVERAGE MODE IN A WIRELESS COMMUNICATION SYSTEM AND DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 37 days.

(21) Appl. No.: 15/762,083

(22) PCT Filed: Sep. 19, 2016

(86) PCT No.: PCT/KR2016/010413
§ 371 (c)(1),
(2) Date: Mar. 21, 2018

(87) PCT Pub. No.: WO2017/052144
PCT Pub. Date: Mar. 30, 2017

(65) Prior Publication Data
US 2018/0270867 A1    Sep. 20, 2018

Related U.S. Application Data

(60) Provisional application No. 62/233,300, filed on Sep. 25, 2015.

(51) Int. Cl.
*H04W 74/08* (2009.01)
*H04W 74/00* (2009.01)

(52) U.S. Cl.
CPC ..... *H04W 74/0833* (2013.01); *H04W 74/006* (2013.01); *H04W 74/08* (2013.01)

(58) Field of Classification Search
CPC ............. H04W 74/08; H04W 74/0833; H04W 74/006
(Continued)

(56) References Cited

U.S. PATENT DOCUMENTS

2012/0002606 A1* 1/2012 Vujcic ................. H04W 36/385
370/328
2012/0314652 A1  12/2012 Ann et al.
(Continued)

FOREIGN PATENT DOCUMENTS

CN    102014516    4/2011
WO    2015083997    6/2015

OTHER PUBLICATIONS

European Patent Office Application Serial No. 16848870.8, Search Report dated Mar. 15, 2019, 12 pages.
(Continued)

*Primary Examiner* — Rownak Islam
(74) *Attorney, Agent, or Firm* — Lee, Hong, Degerman, Kang & Waimey PC (57) ABSTRACT

The present invention relates to a wireless communication system. More specifically, the present invention relates to a method and a device for performing RA procedure in EC mode in a wireless system, the method comprising: selecting a first random access preamble based on a first CE level, when the UE operates in EC mode with the first CE level, transmitting the first random access preamble for a configured number of times, which is determined based on the first CE level, to an eNB, receiving a BI from the eNB within a RAR window associated with the first random access preamble, calculating a BPV based on the received BI and the first CE level, and selecting and transmitting a second random access preamble based on a second CE level, wherein the second random access preamble selection and transmission are delayed by a random backoff time selected
(Continued)

according to a uniform distribution between 0 and the calculated BPV.

10 Claims, 9 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2015/0016312 A1 | 1/2015 | Li et al. | |
| 2015/0117410 A1* | 4/2015 | Wu | H04L 1/08 370/331 |
| 2015/0271686 A1 | 9/2015 | Jha et al. | |
| 2016/0330768 A1* | 11/2016 | Hu | H04W 74/006 |
| 2017/0041960 A1* | 2/2017 | Quan | H04W 4/70 |
| 2017/0374689 A1* | 12/2017 | Liu | H04W 72/042 |

OTHER PUBLICATIONS

LG Electronics, "Considerations on RACH/PRACH transmission for MTC UE", 3GPP TSG RAN WG1 Meeting #80bis, R1-151494, XP050934366, Apr. 2015, 4 pages.

Asustek, "Consideration on random access for further MTC enhancement", 3GPP TSG RAN WG2 Meeting #91, R2-153486, XP051004200, Aug. 2015, 6 pages.

Alcatel-Lucent, "Coverage enhancement for RACH", 3GPP TSG RAN WG2 Meeting #85, R2-140726, XP050792016, Feb. 2014, 6 pages.

PCT International Application No. PCT/KR2016/010413, Notification of Transmittal of the International Search Report and the Written Opinion of the International Searching Authority, or Declaration dated Dec. 20, 2016, 9 pages.

* cited by examiner

(a) Control-Plane Protocol Stack (b) User-Plane Protocol Stack

METHOD FOR PERFORMING RANDOM ACCESS PROCEDURE IN ENHANCED COVERAGE MODE IN A WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2016/010413, filed on Sep. 19, 2016, which claims the benefit of U.S. Provisional Application No. 62/233,300, filed on Sep. 25, 2015, the contents of which are all hereby incorporated by reference herein in their entirety.

TECHNICAL FIELD

The present invention relates to a wireless communication system and, more particularly, to a method for performing Random Access (RA) procedure in Enhanced Coverage (EC) mode in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

Figure 1:
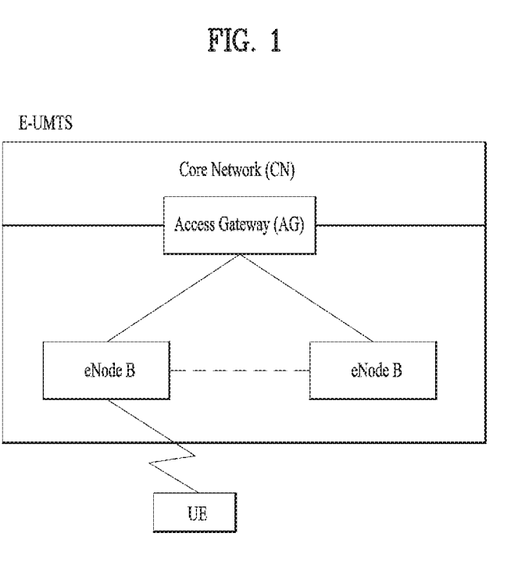
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for a method for performing RA procedure in EC mode in a wireless communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

According to the present invention, UEs having the same Random Access-Radio Network Temporary Identifier (RA-RNTI) but in different Coverage Enhancement (CE) levels will obtain different Backoff Parameter values (BPVs). Thus, it is possible to provide more opportunity of RA preamble transmission for a UE who has transmitted RA preamble less times for fairness.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2A:
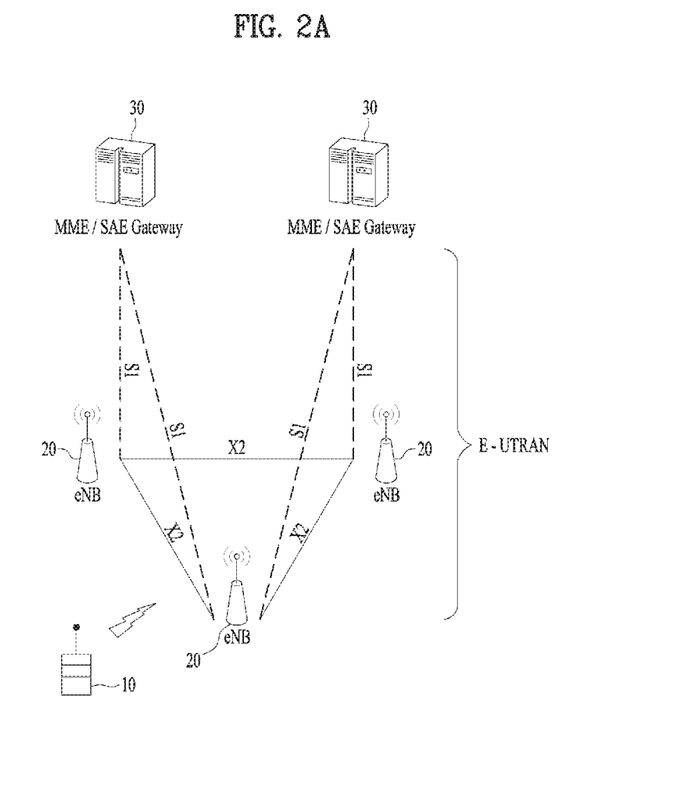
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
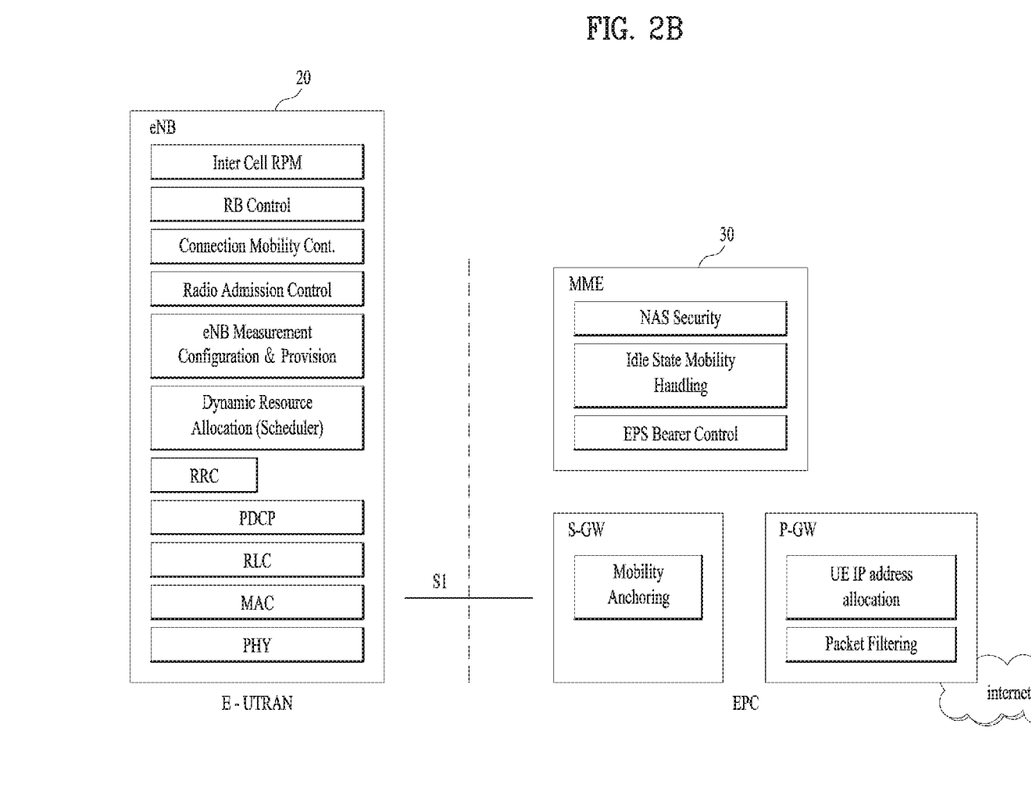
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
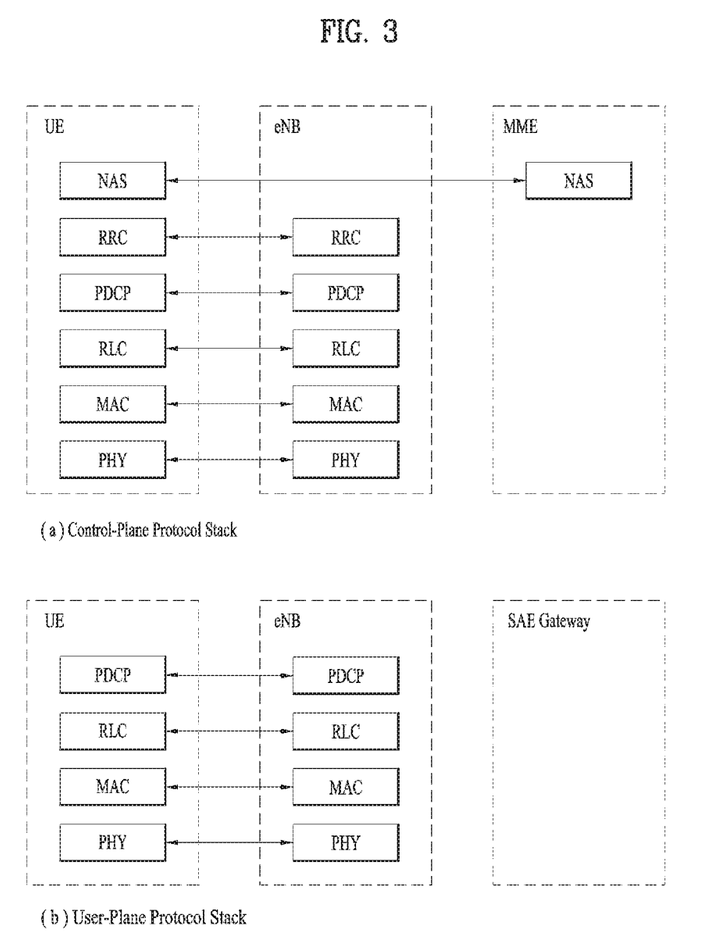
FIG. 3 is a diagram showing a control plane and a user plane of a radio interface protocol between a UE and an E-UTRAN based on a 3rd generation partnership project (3GPP) radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
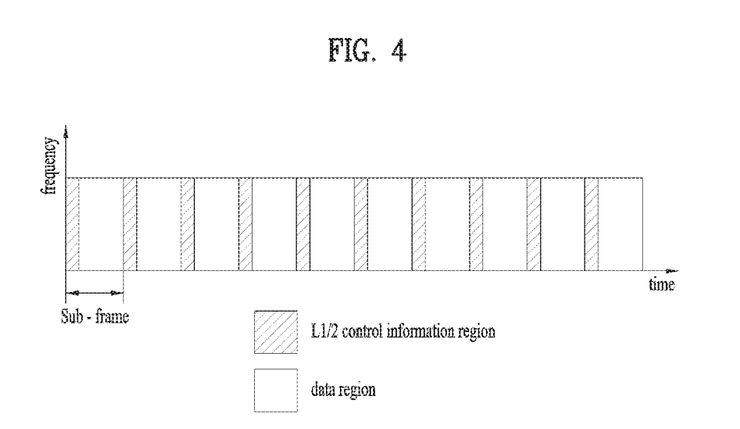
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
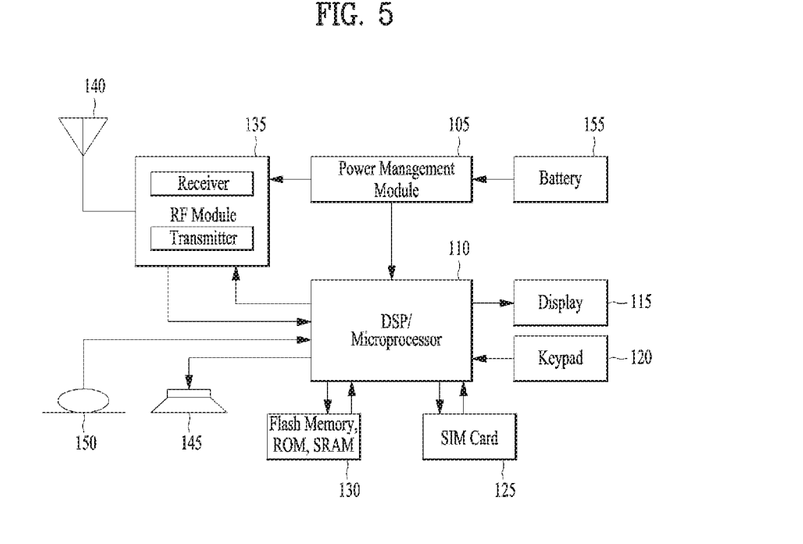
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals).

Similarly, Machine Type Communication (MTC) refers to a communication scheme between one or more machines and is also referred to as machine-to-machine (M2M) communication. Here, a machine refers to an entity which does not require direct human operation or intervention. For example, examples of the machine may include not only a device including a mobile communication module, such as a meter or a vending machine, but also a user equipment such as a smartphone which is capable of automatically accessing a network without operation/intervention of a user to perform communication. Various examples of such a machine are referred to as an MTC device or terminal in the present specification. That is, MTC refers to communication performed by one or more machines (that is, MTC devices) without human operation/intervention.

MTC may include communication between MTC devices and communication between an MTC device and an MTC application server. Examples of communication between an MTC device and an MTC application server include communication between a vending machine and a server, communication between a point of sale (POS) device and a server and an electric meter, and communication between a gas meter or a water meter and a server. MTC-based applications may include security, transportation, healthcare, etc.

Further, for low-end (e.g. low average revenue per user, low data rate, delay tolerant) applications such as some MTC(s), a concept of a low complexity UE is introduced.

A low complexity UE indicates UE Category 0 and has reduced Tx and Rx capabilities compared to other UE of different categories. A low complexity UE may access a cell only if SIB1 indicates that access of low complexity UEs is supported. If the cell does not support low complexity UEs, a low complexity UE considers the cell as barred.

The eNB determines that a UE is a low complexity device based on the LCID for CCCH and the UE capability. The S1 signalling has been extended to include the UE Radio Capability for Paging. This paging specific capability information is provided by the eNB to the MME, and the MME uses this information to indicate to the eNB that the paging request from the MME concerns a low complexity UE.

Supporting bandwidth reduced Low Complexity UEs is introduced below.

A bandwidth reduced low complexity UE can operate in any LTE system bandwidth but with a limited channel bandwidth of 6 PRBs (corresponding to the maximum channel bandwidth available in a 1.4 MHz LTE system) in downlink and uplink. The bandwidth reduced low complexity UE may access a cell only if MIB indicates that access of bandwidth reduced low complexity UEs is supported. UE considers the cell as barred if the cell does not support bandwidth reduced low complexity UEs. The bandwidth reduced low complexity UE receives a separate occurrence of system information blocks (sent using different time/frequency resources). The bandwidth reduced low complexity UE has a transport block (TB) size limited to 1000 bit for broadcast and unicast. The SIB transmission occasions within an SI-window are provided in the SIB1 specific for bandwidth reduced low complexity UEs. The UE determines the TBS of SIB1 specific for bandwidth reduced low complexity UEs based on information in MIB. The BCCH modification period for bandwidth reduced low complexity UEs is a multiple of the BCCH modification period provided in SIB2. The bandwidth reduced low complexity UE can acquire SI messages across SI windows. The bandwidth reduced low complexity UE is not required to detect SIB change when in RRC_CONNECTED. A set of PRACH resources (e.g. time, frequency, preamble); each associated with the coverage enhancement level for bandwidth reduced low complexity UEs in normal coverage, is provided in SIB. Number of PRACH repetitions and number of maximum preamble transmission attempts for bandwidth reduced low complexity UEs in normal coverage are provided in SIB. Time/frequency resources and repetition factor for random access response messages for bandwidth reduced low complexity UEs are derived from the used PRACH resources. Information on whether the paging request is for a bandwidth reduced low complexity UE is provided in S1 paging request signalling.

Supporting UEs in Enhanced Coverage is described below.

A UE in enhanced coverage is a UE that requires the use of coverage enhancement techniques to access the cell. The UE may access a cell using enhanced coverage techniques only if MIB indicates that access of UEs in enhanced coverage is supported. The UE in enhanced coverage receives a separate occurrence of system information blocks (sent using different time/frequency resources). The separate occurrence of SIB1 for UEs in enhanced coverage is identical to the separate occurrence of SIB1 for bandwidth reduced low complexity UEs. The UE in enhanced coverage has a transport block (TB) size limited to 1000 bit for broadcast and unicast. The SIB transmission occasions within an SI-window are provided in the SIB1 specific for UEs in enhanced coverage. The BCCH modification period used for UEs in enhanced coverage is a multiple of the BCCH modification period provided in SIB2. A UE in enhanced coverage can acquire SI messages across SI windows. A UE capable of enhanced coverage acquires, if needed, and uses legacy system information when operating in normal coverage if it is not a bandwidth reduced low complexity UE. The UE capable of enhanced coverage acquires, if needed, and uses system information specific for UEs operating in enhanced coverage. The UE in enhanced coverage is not required to detect SIB change when in RRC_CONNECTED. A set of PRACH resources (e.g. time, frequency, preamble); each associated with a coverage enhancement level, is provided in SIB. Number of PRACH repetitions and number of maximum preamble transmission attempts per coverage enhancement level are provided in SIB. UEs operating in the same enhanced coverage level use random access resources associated with the same coverage enhancement level. Time/frequency resources and repetition factor for random access response messages for UEs in enhanced coverage are derived from the used PRACH resources. The UE in enhanced coverage is paged using the same mechanism for paging bandwidth reduced low complexity UEs. The starting subframe of a paging occasion and the repetition pattern (in both time and frequency domain for downlink common control signaling) of that paging occasion are determined irrespective of the UEs enhanced coverage level. Information from MME to eNB on whether the paging request is for a UE that supports enhanced coverage functionality is provided in S1 paging request signalling. Coverage enhancement level related information and corresponding cell ID are provided from the eNB to the MME to that end. A UE in RRC_IDLE does not inform the network when it changes the enhanced coverage level within a cell or when it changes to another cell. The UE shall re-select to inter-frequency cells in which it is able to operate in normal coverage over cells in which it has to be in enhanced coverage.

As discussed above, in case of Machine Type Communication using the M2M devices, or ProSe communication using the D2D devices, power saving or latency reduction is one of important issues in this technology. Thus, to achieve the power saving or latency reduction, conventional Random Access procedure can be changed appropriately.

Figure 6:
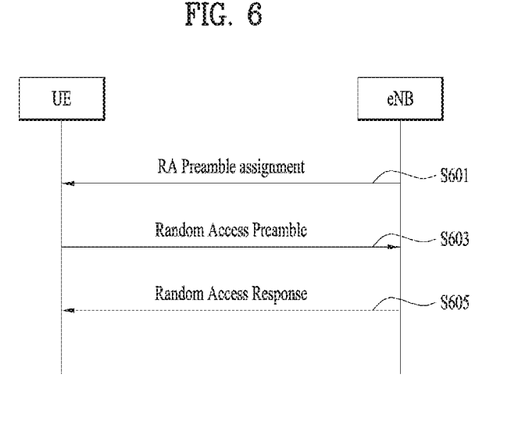
FIGS. 6 and 7 are views illustrating an operating procedure of a terminal (UE) and a base station (eNB) in random access procedure.
Figure 7:
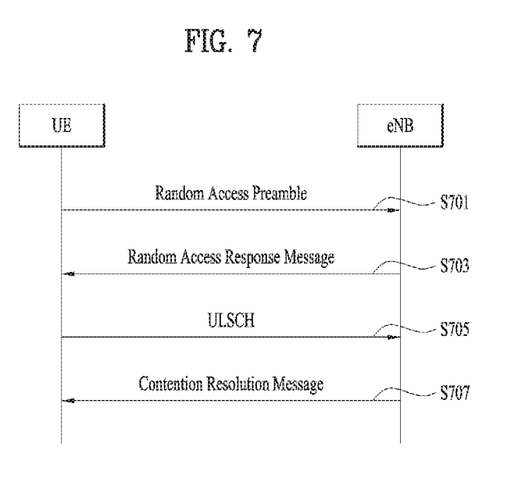

FIGS. 6 and 7 are views illustrating an operating procedure of a terminal (UE) and a base station (eNB) in random access procedure. FIG. 6 is corresponding to non-contention based random access procedure and FIG. 7 is corresponding to contention based random access procedure.

The random access procedure takes two distinct forms. One is a contention based (applicable to first five events) random access procedure and the other one is a non-contention based (applicable to only handover, DL data arrival and positioning) random access procedure. The non-contention based random access procedure is also called as dedicated RACH process.

The random access procedure is performed for the following events related to the PCell: i) initial access from RRC_IDLE; ii) RRC Connection Re-establishment procedure; iii) Handover; iv) DL data arrival during RRC_CONNECTED requiring random access procedure (e.g. when UL synchronization status is "non-synchronized".), v) UL data arrival during RRC_CONNECTED requiring random access procedure (e.g. when UL synchronization status is "non-synchronized" or there are no PUCCH resources for SR available.), and vi) For positioning purpose during RRC_CONNECTED requiring random access procedure; (e.g. when timing advance is needed for UE positioning).

The random access procedure is also performed on a SCell to establish time alignment for the corresponding sTAG. In DC, the random access procedure is also performed on at least PSCell upon SCG addition/modification, if instructed, or upon DL/UL data arrival during RRC_CONNECTED requiring random access procedure. The UE initiated random access procedure is performed only on PSCell for SCG.

Regarding FIG. 6, FIG. 6 shows the non-contention based random access procedure. As described above, a non-contention based random access procedure may be performed in a handover procedure and when the random access procedure is requested by a command of an eNode B. Even in these cases, a contention based random access procedure may be performed.

First, it is important that a specific random access preamble without the possibility of collision is received from the eNode B, for the non-contention based random access procedure.

The UE receives an assigned random access preamble (S601). Methods of receiving the random access preamble may include a method using HO command generated by target eNB and sent via source eNB for handover, a method using a Physical Downlink Control Channel (PDCCH) in case of DL data arrival or positioning, and PDCCH for initial UL time alignment for a sTAG.

The UE transmits the preamble to the eNB after receiving the assigned random access preamble from the eNB as described above (S603).

The UE attempts to receive a random access response within a random access response reception window indicated by the eNode B through handover command or system information after transmitting the random access preamble in step S603 (S605). More specifically, the random access response information may be transmitted in the form of a Medium Access Control (MAC) Packet Data Unit (PDU), and the MAC PDU may be transferred via a Physical Downlink Shared Channel (PDSCH). In addition, the UE preferably monitors the PDCCH in order to enable to the UE to properly receive the information transferred via the PDSCH. That is, the PDCCH may preferably include information about a UE that should receive the PDSCH, frequency and time information of radio resources of the PDSCH, a transfer format of the PDSCH, and the like. Here, if the PDCCH has been successfully received, the UE may appropriately receive the random access response transmitted on the PDSCH according to information of the PDCCH. The random access response may include a random access preamble identifier (e.g. Random Access-Radio Network Temporary Identifier (RA-RNTI)), an UL Grant indicating uplink radio resources, a temporary C-RNTI, a Time Advance Command (TAC), and the like.

As described above, the reason why the random access response includes the random access preamble identifier is because a single random access response may include random access response information of at least one UE and thus it is reported to which UE the UL Grant, the Temporary C-RNTI and the TAC are valid. In this step, it is assumed that the UE selects a random access preamble identifier matched to the random access preamble selected by the UE in step S603.

In the non-contention based random access procedure, it is determined that the random access procedure is normally performed, by receiving the random access response information, and the random access procedure may be finished.

FIG. 7 is a view illustrating an operating procedure of a UE and an eNB in a contention based random access procedure.

When a Random Access procedure is initiated, the Random Access procedure may be performed as follows: i) Flush the Msg3 buffer; ii) set the PREAMBLE_TRANSMISSION_COUNTER to 1; iii) set the backoff parameter value to 0 ms; and iv) proceed to the selection of the Random Access Resource.

In a procedure of the selection of the Random Access Resource, the UE may randomly select a single random access preamble from a set of random access preambles indicated through system information or a handover command, and select and transmit a Physical Random Access Channel (PRACH) capable of transmitting the random access preamble (S701).

There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds is broadcast on system information.

A method of receiving random access response information is similar to the above-described non-contention based random access procedure. That is, the UE attempts to receive its own random access response within a random access response reception window indicated by the eNB through the system information or the handover command, after the random access preamble is transmitted in step S701, and receives a Physical Downlink Shared Channel (PDSCH) using random access identifier information corresponding thereto (S703). Accordingly, the UE may receive a UL Grant, a Temporary C-RNTI, a TAC and the like.

In the step of S703, Random Access Response reception is started after the UE transmits a Random Access Preamble. Once the Random Access Preamble is transmitted and regardless of the possible occurrence of a measurement gap, the MAC entity shall monitor the PDCCH of the SpCell for Random Access Response(s) identified by the RA-RNTI defined below, in the RA Response window (i.e., RAR window) which starts at the subframe that contains the end of the preamble transmission plus three subframes and has length ra-ResponseWindowSize subframes. The RA-RNTI associated with the PRACH in which the Random Access Preamble is transmitted, is computed as:

RA-RNTI=1+t_id+10*f_id

Here, t_id is the index of the first subframe of the specified PRACH (0≤t_id<10), and f_id is the index of the specified PRACH within that subframe, in ascending order of frequency domain (0≤f_id≤6).

The MAC entity may stop monitoring for Random Access Response(s) after successful reception of a Random Access Response containing Random Access Preamble identifiers that matches the transmitted Random Access Preamble.

If a downlink assignment for this TTI has been received on the PDCCH for the RA-RNTI and the received transport block (TB) is successfully decoded, regardless of the possible occurrence of a measurement gap: i) The MAC entity shall set the backoff parameter value as indicated by the Backoff Indicator (BI) field of the BI subheader and Table 1 below, if the Random Access Response contains a Backoff Indicator subheader; ii) Else, the MAC entity set the backoff parameter value to 0 ms.

TABLE 1

| Index | Backoff Parameter value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

If no Random Access Response is received within the RA Response window, or if none of all received Random Access Responses contains a Random Access Preamble identifier corresponding to the transmitted Random Access Preamble, the Random Access Response reception is considered not successful.

When the Random Access Response reception is considered not successful, the MAC entity shall increment PREAMBLE_TRANSMISSION_COUNTER by 1 if the notification of power ramping suspension has not been received from lower layers. If PREAMBLE_TRANSMISSION_COUNTER=preambleTransMax+1, the MAC entity shall: i) indicate a Random Access problem to upper layers if the Random Access Preamble is transmitted on the SpCell, ii) consider the Random Access procedure unsuccessfully completed if the Random Access Preamble is transmitted on an SCell.

If in this Random Access procedure, the Random Access Preamble was selected by MAC, the MAC entity selects a random backoff time according to a uniform distribution between 0 and the Backoff Parameter Value based on the backoff parameter, and delays the subsequent Random Access transmission by the backoff time. And the MAC entity proceeds to selection of a Random Access Resource.

If the UE has received the random access response valid for the UE, the UE may process all of the information included in the random access response. That is, the UE applies the TAC, and stores the temporary C-RNTI. In addition, data which will be transmitted in correspondence with the reception of the valid random access response may be stored in an Msg3 buffer.

The UE uses the received UL Grant so as to transmit the data (that is, the message 3) to the eNB (S705). The message 3 should include a UE identifier. In the contention based random access procedure, the eNB may not determine which UEs are performing the random access procedure, but later the UEs should be identified for contention resolution.

Here, two different schemes for including the UE identifier may be provided. A first scheme is to transmit the UE's cell identifier through an uplink transmission signal corresponding to the UL Grant if the UE has already received a valid cell identifier allocated by a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. If the UE has transmitted data corresponding to the UL Grant, the UE starts a contention resolution (CR) timer.

After transmitting the data with its identifier through the UL Grant included in the random access response, the UE waits for an indication (instruction) from the eNB for contention resolution. That is, the UE attempts to receive the PDCCH so as to receive a contention resolution message (S707).

If Msg3 is transmitted, and if the Contention Resolution is considered not successful, the MAC entity shall: i) flush the HARQ buffer used for transmission of the MAC PDU in the Msg3 buffer; ii) increment PREAMBLE_TRANSMISSION_COUNTER by 1 if the notification of power ramping suspension has not been received from lower layers; iii) indicate a Random Access problem to upper layers if PREAMBLE_TRANSMISSION_COUNTER=preambleTransMax+1; iv) select a random backoff time according to a uniform distribution between 0 and the Backoff Parameter Value based on the backoff parameter; v) delay the subsequent Random Access transmission by the backoff time; and vi) proceed to the selection of a Random Access Resource.

At completion of the Random Access procedure, the MAC entity shall i) discard explicitly signalled ra-PreambleIndex and ra-PRACH-MaskIndex, if any; and ii) flush the HARQ buffer used for transmission of the MAC PDU in the Msg3 buffer.

FIGS. 8A to 8D are diagrams for MAC PDU including Random Access Response.

Figure 8A:
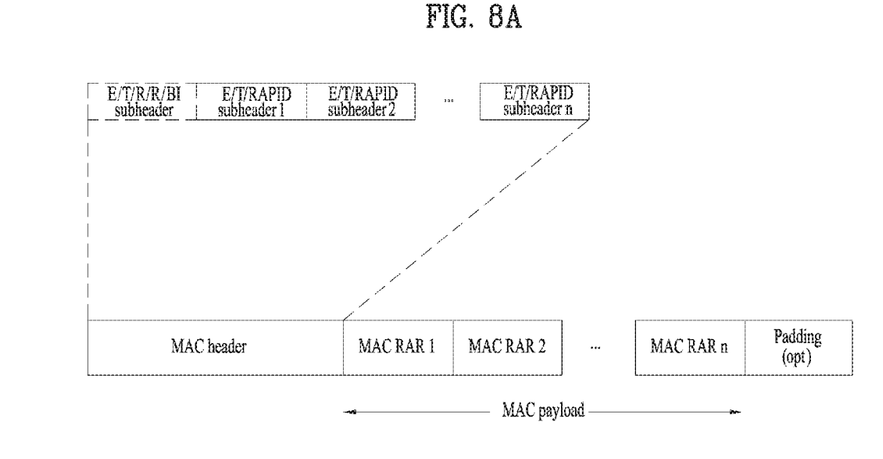
FIGS. 8A to 8D are diagrams for MAC PDU including Random Access Response.
Figure 8B:
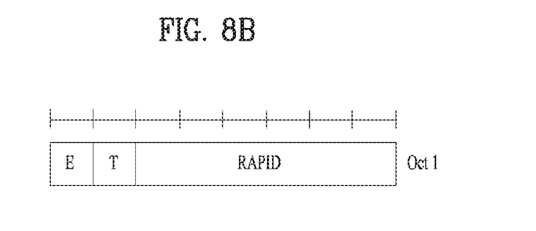

FIG. 8A is an example of MAC PDU consisting of a MAC header and MAC RARs. A MAC PDU consists of a MAC header and zero or more MAC Random Access Responses (MAC RAR) and optionally padding.

The MAC header is of variable size. A MAC PDU header consists of one or more MAC PDU subheaders; each subheader corresponding to a MAC RAR except for the Backoff Indicator subheader. If included, the Backoff Indicator subheader is only included once and is the first subheader included within the MAC PDU header.

Figure 8C:
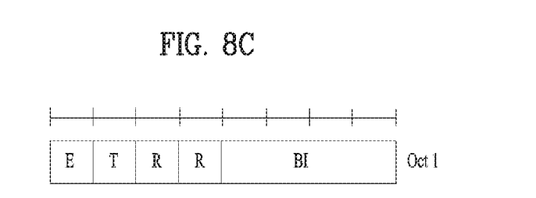

A MAC PDU subheader consists of the three header fields E/T/RAPID (as described in FIG. 8B) but for the Backoff Indicator subheader which consists of the five header field E/T/R/R/BI (as described in FIG. 8C).

Figure 8D:
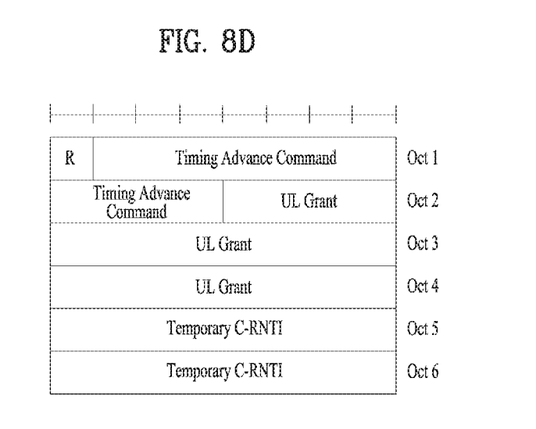

A MAC RAR consists of the four fields R/Timing Advance Command/UL Grant/Temporary C-RNTI (as described in FIG. 8D). Padding may occur after the last MAC RAR. Presence and length of padding is implicit based on TB size, size of MAC header and number of RARs.

The MAC header is of variable size and consists of the following fields:

- E: The Extension field is a flag indicating if more fields are present in the MAC header or not. The E field is set to "1" to indicate at least another set of E/T/RAPID fields follows. The E field is set to "0" to indicate that a MAC RAR or padding starts at the next byte;
- T: The Type field is a flag indicating whether the MAC subheader contains a Random Access ID or a Backoff Indicator. The T field is set to "0" to indicate the presence of a Backoff Indicator field in the subheader (BI). The T field is set to "1" to indicate the presence of a Random Access Preamble ID field in the subheader (RAPID);
- R: Reserved bit, set to "0";
- BI: The Backoff Indicator field identifies the overload condition in the cell. The size of the BI field is 4 bits;
- RAPID: The Random Access Preamble IDentitfier field identifies the transmitted Random Access Preamble. The size of the RAPID field is 6 bits.

The MAC header and subheaders are octet aligned.

In legacy RA procedure, the UE monitors the RAR within a RAR window after RA preamble transmission. The RAR is sent on PDSCH and its presence is signalled on PDCCH addressed by the RA-RNTI. If RAR reception was not successful, then the UE repeats RA preamble transmission. If RAR reception was successful then the UE sends Msg 3. When RAR reception was not successful, the UE repeats RA preamble transmission only after backoff time which is determined based on the Backoff Parameter Value. The purpose of delaying the subsequent RA preamble transmission is to avoid contention when lots of UEs are simultaneously transmitting RA preamble. It is noted that all UEs having the same RA-RNTI would apply the same Backoff Parameter Value.

Meanwhile, the legacy RA procedure may be not suitable for a RA procedure of Low Cost (LC) and Enhanced Coverage (EC) UE, and it will be discussed with reference to FIG. 9.

Figure 9:
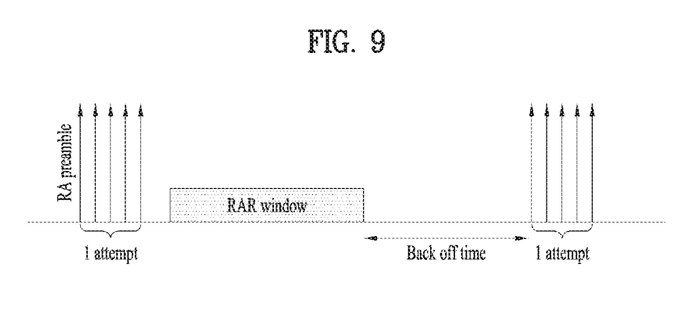
FIG. 9 shows an exemplary RA procedure of Low Cost (LC) and Enhanced Coverage (EC) UE.

FIG. 9 shows an exemplary RA procedure of LC/EC UE.

In Rel-13, LC/EC UE is introduced. Due to its limited device performance, LC/EC UE transmits data repeatedly depending on its CE level.

Accordingly, in RA procedure, LC/EC UE will repeatedly transmit RA preambles (1 attempt), and then monitors the RAR within a RAR window. If RAR reception fails, the LC/EC UE will perform subsequent transmission of RA preambles for another attempt after the backoff time. It is noted that 1 attempt of transmission refers a configured number of repeated transmission, and the number of repetition depends on CE level.

In the legacy, all UEs having the same RA-RNTI apply the same Backoff Parameter Value. The reason is to distribute the subsequent RA preamble transmission of the UEs who transmitted RA preamble on the same time/frequency resource.

In MTC, LC/EC UEs in different CE levels may transmit RA preamble on the same time/frequency resource. Then, those UEs would receive the same Backoff Parameter Value even though the actual number of RA preamble transmissions are different each other. This implies that, a LC/EC UE in lower CE level would delay the subsequent RA preamble transmission based on the same Backoff Parameter Value as a LC/EC in higher CE level, which seems not so fair from a LC/EC UE in lower level point of view.

Therefore, a mechanism is needed to provide more opportunity of RA preamble transmission for the UE who has transmitted RA preamble less times for fairness.

Thus, it is invented for a UE performing RA procedure in Enhanced Coverage (EC) mode, when the UE receives a Backoff Index (BI) from an eNB, the UE calculates the backoff time (BOT) based on both of the received Backoff Index and the Coverage Enhancement (CE) level of the UE. More specific descriptions will be introduced with reference to FIG. 10.

Figure 10:
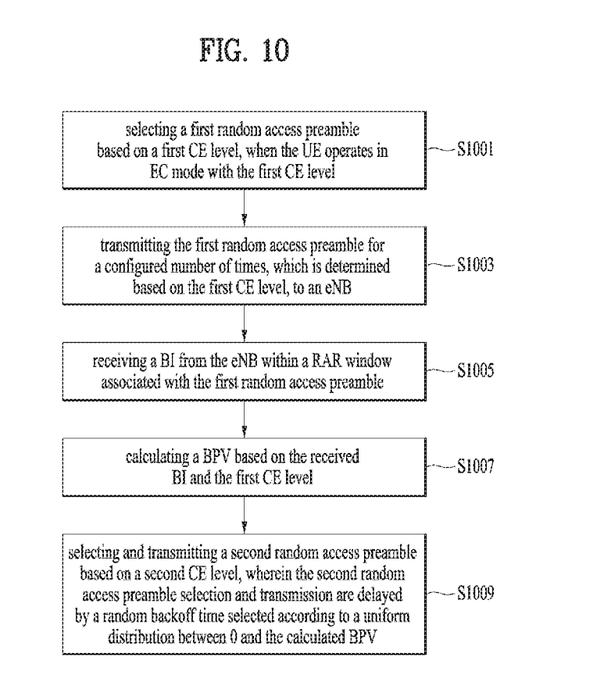
FIG. 10 is a conceptual diagram for operating RA procedure in a wireless communication system according to embodiments of the present invention.

FIG. 10 is a conceptual diagram for operating RA procedure in Enhanced Coverage (EC) mode in a wireless communication system according to embodiments of the present invention.

A UE is operating in EC mode with a Coverage Enhancement (CE) level N (Here, N is interger). The UE initiates a random access procedure and transmits a random access preamble (RAP) to an eNB for a configured number of times, wherein the configured number is determined based on the CE level N.

The UE monitors PDCCH addressed by RA-RNTI within a RAR window. The RA-RNTI is determined based on the time resource and frequency resource the UE transmits the RAP, and/or the CE level N.

In RAR window, the UE receives a Backoff Index (BI) from the eNB, wherein the UE receives the BI as follows: i) The BI is included in RAR message which is transmitted on PDSCH indicated by the PDCCH addressed to the RA-RNTI; or ii) The BI is included in PDCCH addressed to the RA-RNTI.

When the UE receives the BI from the eNB, the UE sets the Backoff Parameter value (BPV) based on the received BI and the CE level N and/or RA-RNTI.

More specifically, the UE multiplies BI by K and the CE level N, wherein K is a pre-defined value e.g., 20 ms, and refers the interval between each BI. In other words, the UE calculates BPV as BPV=BI×K×CE level N.

For example, if the UE receives BI=3 and if the UE is in CE level 1, the UE calculates BPV as BPV=3×1×20 ms=60 ms. Or, if the UE receives BI=3 and if the UE is in CE level 2, the UE calculates BPV as BPV=3×2×20 ms=120 ms.

That is, if the UEs have the same RA-RNTI but in different CE levels, the UEs will obtain different BPVs. If the UEs have different RA-RNTIs and the UEs are in the same CE levels, the UEs will obtain the same BPVs.

When the UE calculates the BPV, if the UE is in different CE level compared to the CE level at a time point when the UE transmitted RAP, the UE uses the CE level N at the time point when the UE transmitted RAP. For example, the UE was in CE level N1 when the UE transmitted RAP and the UE receives RAR which indicates that the UE will be in CE level N2. Then, the UE multiples BI by K and the CE level N1 (i.e., not use the CE level N2 but use the CE level N1).

After the UE calculates and sets the BPV, if the UE needs to perform the subsequent RAP transmission, the UE delays the subsequent RAP preamble by selecting a random BOT according to a uniform distribution between 0 and the calculated BPV.

Referring to FIG. 10, a UE, which operates in Enhanced Coverage (EC) mode with a first CE level, selects a first random access preamble based on a first Coverage Enhancement (CE) level (S1001). After that, the UE transmits the first random access preamble for a configured number of times, which is determined based on the first CE level, to an eNB (S1003). The first CE level and the configured number of times may have proportional relationship.

After the transmission, the UE receives a Backoff Index (BI) from the eNB within a random access response (RAR) window associated with the first random access preamble (S1005). Preferably, the BI is received via a RAR message which is transmitted on physical downlink shared channel (PDSCH) indicated by a physical downlink control channel (PDCCH) addressed to a random access-radio network temporary identifier (RA-RNTI) associated with the first random access preamble, or via the PDCCH addressed to the RA-RNTI associated with the first random access preamble.

Meanwhile, in the present embodiment, the RAR message indicates that the UE is to operate in EC mode with a second CE level.

After receiving the BI from the eNB, the UE calculates a Backoff Parameter value (BPV) based on the received BI and the first CE level (S1007). It is noted that the UE calculates the BPV based on the first CE level, not the second CE level. More specifically, when the UE calculates the BPV, the UE multiplies the BI by K and the first CE level, wherein K is pre-defined value (e.g., 20 ms).

Meanwhile, a value of the BPV for the UE is different from a value of another BPV for another UE even if the UE and the another UE have a same RA-RNTI, if the another UE operates in EC mode with another CE level different from the first CE level. If the first CE level for the UE is larger than the another CE level for the another UE, the value of the BPV for the UE is larger than the another BPV for the another UE.

The UE selects and transmits a second random access preamble based on a second CE level, wherein the second random access preamble selection and transmission are delayed by a random backoff time selected according to a uniform distribution between 0 and the calculated BPV (S1009).

In summary, according to the present invention, UEs having the same RA-RNTI but in different CE levels will obtain different BPVs, thus it is possible to provide more opportunity of RA preamble transmission for a UE who has transmitted RA preamble less times for fairness.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a user equipment (UE) operating in a wireless communication system, the method comprising:
   selecting a first random access preamble based on a first Coverage Enhancement (CE) level, when the UE operates in Enhanced Coverage (EC) mode with the first CE level;
   transmitting the first random access preamble for a configured number of times, which is determined based on the first CE level, to an eNB;
   receiving a Backoff Index (BI) from the eNB within a random access response (RAR) window associated with the first random access preamble;
   calculating a Backoff Parameter value (BPV) based on the received BI and the first CE level; and
   selecting and transmitting a second random access preamble based on a second CE level, wherein the second random access preamble selection and transmission are delayed by a random backoff time selected according to a uniform distribution between 0 and the calculated BPV,
   wherein a value of the BPV for the UE is different from a value of another BPV for another UE even if the UE and the another UE have a same random access-radio network temporary identifier (RA-RNTI), wherein the another UE operates in EC mode with another CE level different from the first CE level.

2. The method according to claim 1,
   wherein the BI is received via a RAR message which is transmitted on physical downlink shared channel (PDSCH) indicated by a physical downlink control channel (PDCCH) addressed to a RA-RNTI associated with the first random access preamble, or via the PDCCH addressed to the RA-RNTI associated with the first random access preamble.

3. The method according to claim 2,
   wherein the RAR message indicates that the UE is to operate in EC mode with the second CE level.

4. The method according to claim 1,
   wherein when the UE calculates the BPV, the UE multiplies the BI by K and the first CE level, wherein K is pre-defined value.

5. The method according to claim 1,
   wherein if the first CE level for the UE is larger than the another CE level for the another UE, the value of the BPV for the UE is larger than the another BPV for the another UE.

6. A User Equipment (UE) for operating in a wireless communication system, the UE comprising:
   a transceiver; and
   a processor operably coupled with the transceiver and configured to:
   select a first random access preamble based on a first Coverage Enhancement (CE) level, when the UE operates in Enhanced Coverage (EC) mode with the first CE level,
   transmit the first random access preamble for a configured number of times, which is determined based on the first CE level, to an eNB,
   receive a Backoff Index (BI) from the eNB within a random access response (RAR) window associated with the first random access preamble,
   calculate a Backoff Parameter value (BPV) based on the received BI and the first CE level, and
   select and transmit a second random access preamble based on a second CE level, wherein the second random access preamble selection and transmission are delayed by a random backoff time selected according to a uniform distribution between 0 and the calculated BPV,
   wherein a value of the BPV for the UE is different from a value of another BPV for another UE even if the UE and the another UE have a same random access-radio network temporary identifier (RA-RNTI), wherein the another UE operates in EC mode with another CE level different from the first CE level.

7. The UE according to claim 6,
   wherein the BI is received via a RAR message which is transmitted on physical downlink shared channel (PDSCH) indicated by a physical downlink control channel (PDCCH) addressed to a RA-RNTI associated with the first random access preamble, or via the PDCCH addressed to the RA-RNTI associated with the first random access preamble.

8. The UE according to claim 7,
   wherein the RAR message indicates that the UE is to operate in EC mode with the second CE level.

9. The UE according to claim 6,
   wherein when the UE calculates the BPV, the UE multiplies the BI by K and the first CE level, wherein K is pre-defined value.

10. The UE according to claim 6,
    wherein if the first CE level for the UE is larger than the another CE level for the another UE, the value of the BPV for the UE is larger than the another BPV for the another UE.

* * * * *